United States Patent [19]

Dreessen et al.

[11] Patent Number: 5,400,176
[45] Date of Patent: Mar. 21, 1995

[54] ILLUMINATING APPARATUS COMPRISING A FIBER LIGHT GUIDE FOR A MICROSCOPE

[75] Inventors: Jörg Dreessen, Hannover; Arthur Konnerth, Goettingen, both of Germany

[73] Assignee: Max-Planck-Gesellschaft zur Foerderung der Wissenschaften e.V., Goettingen, Germany

[21] Appl. No.: 938,899

[22] Filed: Aug. 31, 1992

[30] Foreign Application Priority Data

Sep. 3, 1991 [DE] Germany .................. 9110927 U

[51] Int. Cl.⁶ .................................................. G02B 21/06
[52] U.S. Cl. ................................. 359/385; 359/390; 385/31; 385/91; 385/93; 362/32
[58] Field of Search ............... 359/368, 385, 387–390, 359/892, 386, 889, 811, 813, 822–823; 385/31, 77, 88, 90, 91–93; 362/32, 293

[56] References Cited

U.S. PATENT DOCUMENTS

| | | | |
|---|---|---|---|
| 3,669,524 | 6/1972 | Shio | 359/385 |
| 4,505,555 | 3/1985 | Piller et al. | 359/390 |
| 5,022,744 | 6/1991 | Leiter | 359/385 |
| 5,341,275 | 8/1994 | Ghandehari | 359/385 |

*Primary Examiner*—Loha Ben
*Assistant Examiner*—James Phan
*Attorney, Agent, or Firm*—Nields & Lemack

[57] ABSTRACT

Illuminating apparatus for a microscope comprising a light source and filter changer which is arranged in a beam path between the light source and a specimen location of the microscope. The light source and the filter changer are arranged in a unit spatially and mechanically separate from the microscope and the beam path between the filter changer and the microscope includes a flexible fiber light guide.

10 Claims, 1 Drawing Sheet

ILLUMINATING APPARATUS COMPRISING A FIBER LIGHT GUIDE FOR A MICROSCOPE

FIELD OF THE INVENTION

The present invention relates to an illuminating apparatus for a microscope.

DESCRIPTION OF THE RELATED ART

It is known to measure the $Ca^{++}$ kinetics of biological material with the aid of a fluorescence indicator (e.g. Fura-2) in which the intensity ratio of the fluorescence emissions stimulated by UV radiation of two different wavelengths depends on the calcium ion concentration. The stimulation radiation is generally generated by filtering the desired wavelengths consecutively from a suitable continuum.

To obtain as good as possible a time resolution of the $Ca^{++}$ concentration determination the filters for the different wavelengths, which are usually arranged in a rotatable filter wheel, must be changed as quickly as possible. This requires however high mechanical forces, in particular torques, which lead to undesirable vibrations. These vibrations make it practically impossible to carry out simultaneously with the measurement of the calcium ion concentration a derivation of potentials from biological material by fine probes, as is for example necessary in electrophysiological measurements on nerve cells with simultaneous determination of the variation of the intracellular calcium ion concentration in an imaging method.

Another source of disturbance is the light source, due to the heat emitted thereby which impairs the preparation and can cause an undesirable convection and thus dust formation at the measurement location.

Corresponding problems also occur in other microscopic operations.

SUMMARY OF THE INVENTION

The present invention is accordingly based on the problem of providing a reflected light illuminating apparatus for a microscope which avoids disturbances due to heat and/or vibrations originating from the light source or devices associated therewith.

The invention provides an illuminating apparatus for a microscope comprising a light source and a filter changer which is arranged in a beam path between the light source and a specimen location of the microscope. According to a preferred embodiment of the invention the light source and the filter changer are arranged in a unit spatially and mechanically separate from the microscope and the beam path between the filter changer and the microscope runs through a flexible fiber light guide.

Since in the present illuminating apparatus the light source is accommodated with the filter changer and possibly a light shutter, which are potential sources of mechanical vibrations, in a unit separate from the microscope and optically coupled by a flexible light guide to the illuminating beam path of the microscope, said unit can be set up separately from the microscope and possibly isolated from vibration so that even on a rapid wavelength change no vibrations can be transmitted to the microscope and to the specimen arranged therein. For the same reason disturbances due to the heat emitted by the light source are also avoided.

Preferred embodiments of the present illuminating apparatus permit a sectionwise illumination of the specimen, both the diameter of the illuminating spot and the position thereof being variable. Further advantages of the present illuminating apparatus, in particular in fluorescence microscopic investigation of biological specimens, are: Less disturbing autofluorescence and thus less background signal; less UV light acting on the entire specimen; a higher illumination strength at the location of the specimen; a more economical utilization of the space on the measuring table, a lower mass at the focussing drive of the microscope and consequently a higher mechanical stability and less mechanical wear; no heating of measuring location and microscope by the light source, and consequently no temperature drift of the illumination focus and the depth of focus plane so that during the experiment no subsequent adjustment is necessary and improved temperature constancy of the specimen is ensured; no interferences by convection in the region of the specimen and consequently less dust disturbance; no toxic gases in the region of the microscope because the light source is remote from the measuring station and therefore greater facility of extracting the toxic gases arising at the light source; simpler accessibility of the specimen for adjustment.

BRIEF DESCRIPTION OF THE DRAWINGS

Hereinafter a preferred embodiment of the invention will be explained in detail with reference to the drawings, wherein.

DESCRIPTION OF THE PREFERRED EMBODIMENT

Figure 1:
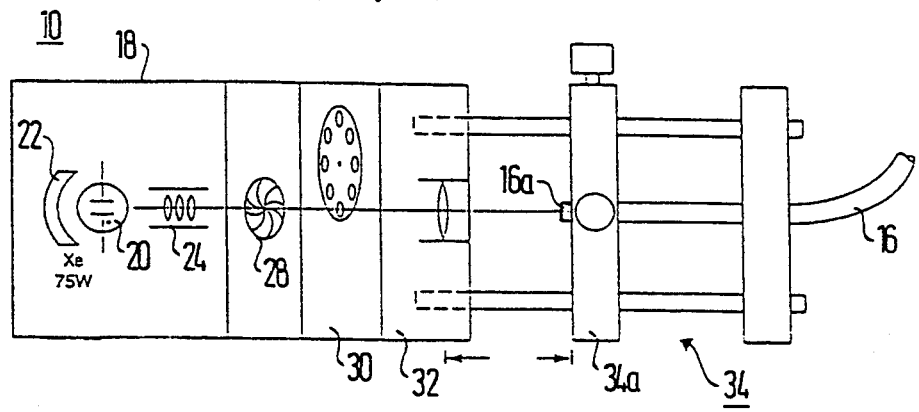
FIG. 1 shows a light source unit of the present illuminating apparatus.

The present illuminating apparatus consists of two parts, a first part (FIG. 1) referred to briefly as "light source" unit 10" and a second part, referred to briefly as "coupling-in unit 12⇌ and associated with an only partially schematically illustrated microscope 14. The light source unit 10 and the coupling-in unit 12 are optically coupled together by a flexible optical waveguide 16. The light source unit 10 includes a commercially usual microscope lamp housing 18 in which a light source 20, in the present example a 75 V xenon high-pressure lamp, and a usual optical system having a concave reflector 22 and a condenser 24 are arranged. In the beam path between the light source 20 and a specimen location 26 (FIG. 2) in the unit 10 the light source 20 is followed by a light shutter 28, a filter changer 30 containing a power rotatable filter wheel and an adapter 32 having a lens which focuses the radiation of the light source into a light entrance end 16a of the optical waveguide 16. The light entrance end of the optical waveguide 16 is held in an x-y adjustment member 34a of a micro-optical bench 34 which permits adjustment of the light entrance end 16a both in the longitudinal direction and in the transverse direction of the beam path of the light beam emerging from the light source unit.

In the present embodiment the optical waveguide 16 is a quartz monofiber having a diameter of 1.2 mm and of desired length, for example 100 cm. A light exit end 16b of the optical waveguide 16 is adjustable transversely of the beam path in an x-y adjustment member 36a of a second micro-optical bench 36 which is mounted along the beam path of the light emerging from the light exit end 36a and includes a lens 38, an iris diaphragm 40 mounted in a second x-y adjustment member 36b, a filter holder 42 and an adapter comprising a lens 44. The optical benches 34, 36 are commercially available and permit a displacement of the elements mounted in them in the direction of the respective beam path along four parallel mounting rods.

As usual in fluorescence microscopes the microscope 14 includes a dichroic mirror 46 which reflects UV radiation but transmits longer wave visible light, including the fluorescence radiation, along a microscope beam path 48 from the specimen location 26 to an image acquisition unit 50 which may include an electronic camera with a connected electronic image processing system and/or an eyepiece. The UV radiation reflected by the dichroic mirror 46, the wavelength of which is periodically changed by the filter changer 30, is projected onto the specimen by the dichroic mirror 46, a Telan lens and the microscope objective 54.

Figure 2:
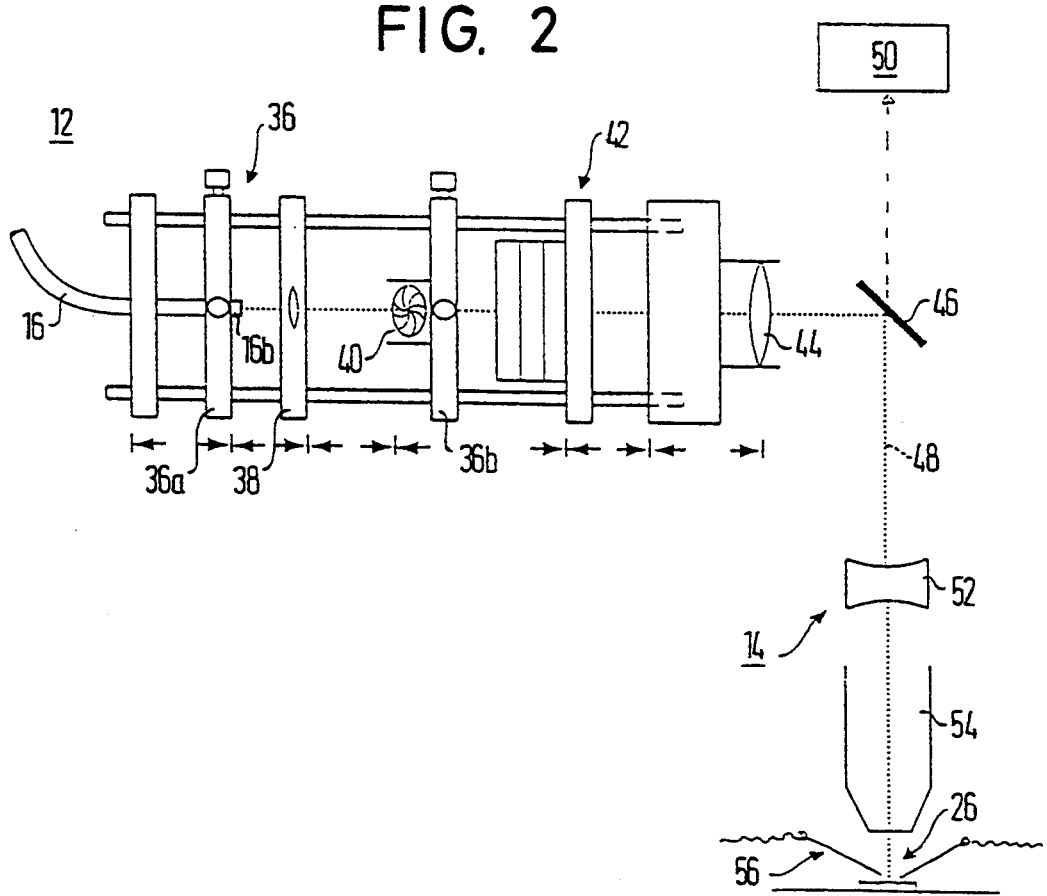
FIG. 2 shows a light coupling unit which is associated with a fluorescence microscope, only partially illustrated.

Since the light source unit 10, which includes all the elements which can give rise to mechanical vibrations, such as the shutter 28 and in particular the filter changer 30, is mechanically separated from the microscope 14 by the optical waveguide, vibration-free investigation of the specimen is possible and in particular electrophysiological derivations may be carried out by means of fine electrodes 56, as indicated only schematically in FIG. 2.

The microscope 14 employed may be a commercially available Zeiss upright microscope. The diaphragm 40 makes it possible to adjust the diameter of the illumination spot so that a sectionwise illumination of the specimen can easily be achieved. The location of the illumination spot on the specimen can be varied by means of the x-y adjustment members of the coupling-in unit 12.

The invention is not restricted to fluorescence microscopes. The mirror 46 may be a semitransparent mirror not selective as regards wavelengths or any other suitable reflector. A different lamp type could also be used as light source. The invention is useful in all cases where vibration-free working with a microscope is necessary unimpaired by the heat development of the light source, in particular convection-free and thus dust-free, for example in semiconductor production.

We claim:

1. Illuminating apparatus for a microscope comprising a light source (20) and a filter changer (30) which is arranged in a beam path between the light source and a specimen location (26) of the microscope (14), wherein the light source (20) and the filter changer (30) are arranged in a unit (10) spatially and mechanically separate from the microscope (14), wherein the beam path between the filter changer (30) and the microscope (14) includes a flexible fiber light guide (16), wherein there is provided a coupling-in unit (12) which is associated with the microscope (14) and which is mechanically and optically coupled to a light exit end (16b) of the flexible fiber light guide (16), and wherein the coupling-in unit includes a filter holder (42).

2. Illuminating apparatus according to claim 1, wherein the unit (10) containing the light source (20) further includes a light shutter (28).

3. Illuminating apparatus according to claim 1, wherein the light source unit includes an adapter lens (32).

4. Illuminating apparatus according to claim 1, wherein the light source unit (10) includes a device (34) for mechanical adjustment of the position of the light entrance end (16a) of the flexible fiber light guide (16).

5. Illuminating apparatus according to claim 1, wherein the coupling-in unit (12) includes an adjustable diaphragm (40).

6. Illuminating apparatus according to claim 5, wherein there is provided a device (36b) for adjusting the position of the diaphragm (40) transversely of the beam path.

7. Illuminating apparatus according to claim 1, wherein the coupling-in unit includes at least one lens (38, 44).

8. Illuminating apparatus according to claim 1, wherein the coupling-in unit includes a device (36a) for adjusting the position of the light exit end (16b) of the flexible fiber light guide (16).

9. Illuminating apparatus according to claim 1, wherein there is provided an optical bench (36) for adjustable mounting of elements of the coupling-in unit.

10. Illuminating apparatus according to claim 1, wherein in the beam path (48) of the microscope (14) a semitransparent mirror (46) is arranged which reflects the light emerging from the flexible fiber light guide (16) to the specimen location (26) and allows the fluorescence light emanating from the specimen location to pass through to an image acquisition means (50).

* * * * *